A. SONANDER.
AUTOMATIC WEIGHING MACHINE.
APPLICATION FILED MAR. 22, 1909.

965,959.

Patented Aug. 2, 1910.

3 SHEETS—SHEET 1.

UNITED STATES PATENT OFFICE.

ANDREW SONANDER, OF SPRINGFIELD, OHIO, ASSIGNOR TO THE WINTERS-COLEMAN SCALE COMPANY, OF SPRINGFIELD, OHIO, A CORPORATION OF OHIO.

AUTOMATIC WEIGHING-MACHINE.

965,959.  Specification of Letters Patent.  Patented Aug. 2, 1910.

Application filed March 22, 1909. Serial No. 484,942.

*To all whom it may concern:*

Be it known that I, ANDREW SONANDER, a citizen of the United States, residing at Springfield, in the county of Clark and State of Ohio, have invented certain new and useful Improvements in Automatic Weighing-Machines, of which the following is a specification.

My invention relates to improvements in automatic weighing apparatus and particularly to an automatic attachment for standard weighing apparatus.

My improvement is in simplifying and improving the operation of the device described in my application, Ser. No. 409,109, and especially in making it better adapted to handle a greater diversity of grains and gravity flowing materials.

Figure 1:
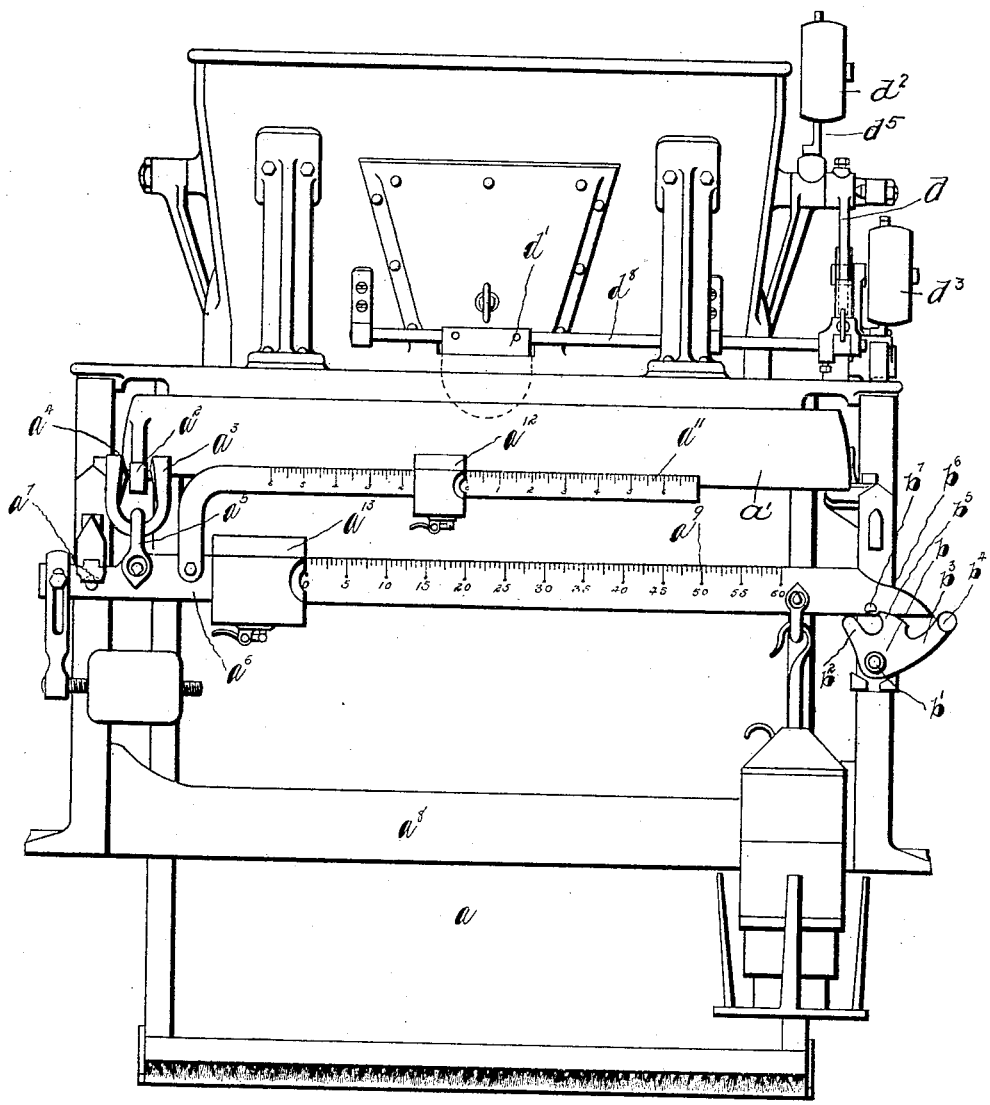
Figure 2:
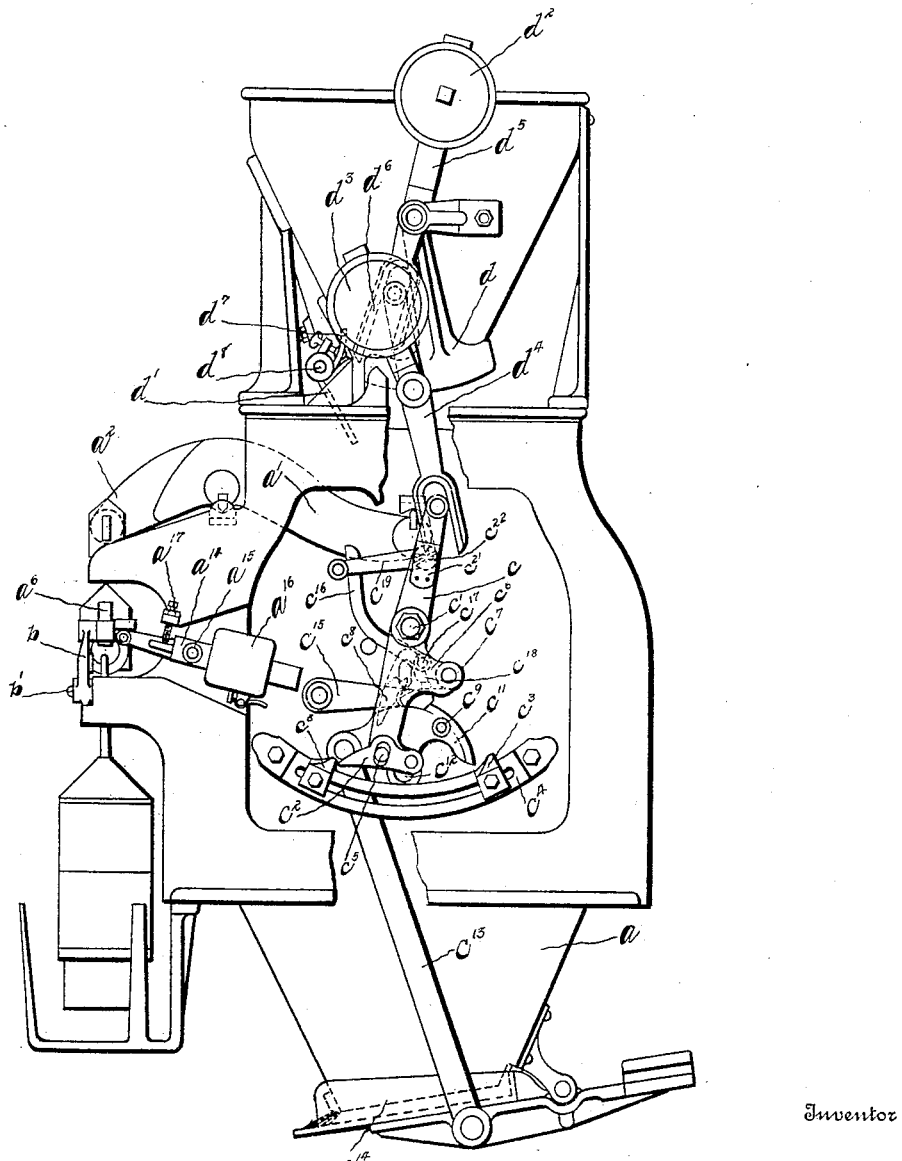
Figure 3:
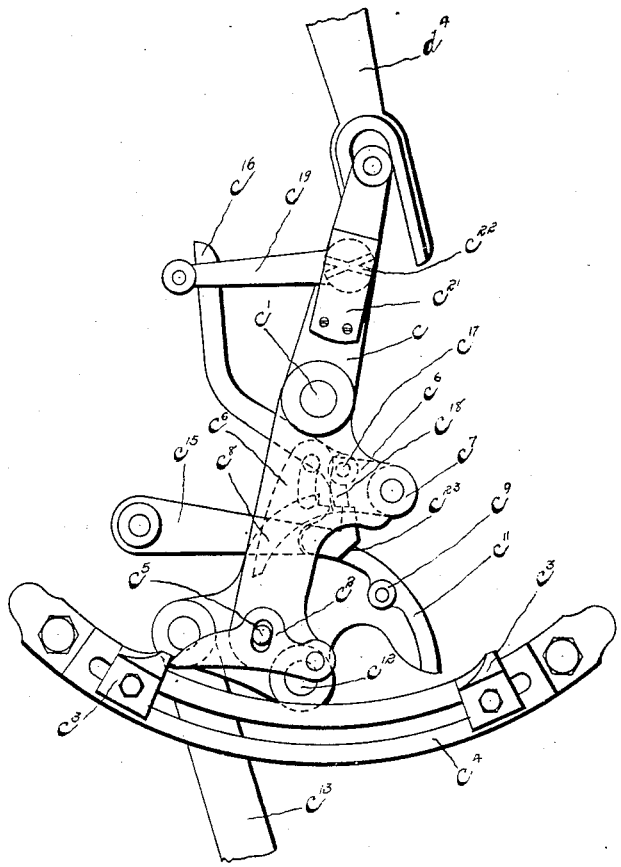

In the drawings Figure 1 is a front view of my apparatus. Fig. 2 is an end view. Fig. 3 is a detail view showing parts connected with the swinging pendant.

Like letters of reference indicate like parts throughout the several views.

A movable weighing receptacle designated by the reference letter, $a$, is suspended from the lever frame, $a^1$ (see Figs. 1 and 2), the bearing plates and bearings being substantially as shown and described in said application heretofore referred to. I employ a projecting lever arm, $a^2$, and link $a^3$, suspended from the bearing, $a^4$, on the lever arm, $a^2$, and connecting in turn with the link, $a^5$, which supports the weigh beam, $a^6$, substantially in the manner shown in the said application. The weigh beam is fulcrumed at the point, $a^7$, on the main frame $a^8$ (see Fig. 1) and the movable weighing receptacle is preferably connected with the long arm of the weigh beam at a point preferably between the fulcrum and the end of the weigh beam and in close proximity to the fulcrum. I preferably employ a weigh beam of the steelyard type and same is connected to the movable lever frame, which is the supporting frame for the hopper, precisely in the manner heretofore described in the said application. The weigh beam is bifurcated at its free end and the lower part of the beam is graduated with main graduations, whereas the upper part of the beam preferably has supplemental graduations. I shall call the main graduations, $a^9$, and the supplemental, $a^{11}$. The upper arm of the main weigh beam is preferably bolted rigidly thereto. It will be noted from Fig. 1 that I employ the supplemental graduations, $a^{11}$, exactly as shown in the said application, the zero point being near the center of the arm and the graduations in units and small fractions of the units to the right and to the left of the zero. Coöperating with the supplemental graduations I employ a supplemental poise, $a^{12}$, and a poise, $a^{13}$, coöperating with the main graduations, $a^9$.

Instead of the supplemental beam assisting the principal beam to its intermediate position located as set forth in the said application, I have employed a supplemental lever, $a^{14}$, pivoted to the stationary frame at $a^{15}$ (see Fig. 2), for the purpose of so assisting the said beam. A sliding poise, $a^{16}$, on this supplemental lever is provided to regulate the degree of said assistance; adjustments of this poise outward on the supplemental lever increase the assistance and adjustments inward decrease the assistance. The screw, $a^{17}$, furnishes a stationary stop for the said lever, $a^{14}$, and the parts are so arranged that when the main weigh beam is at balancing position the stop, $a^{17}$, will prevent the supplemental lever, $a^{14}$, from exerting any further influence upon said weigh beam. In combination with this supplemental lever, $a^{14}$, pivoted to the stationary frame at $a^{17}$, (below the free end of the weigh beam, $a^6$,) I employ a retarding device, $b$, (see Fig. 1) which is located near the free end of the weigh beam and in close proximity to the supplemental lever, $a^{14}$. This retarding device, $b$, operates substantially in the manner explained in the said application. It is pivoted at $b^1$ and comprises a lug, $b^2$, and an arm, $b^3$, having at its free end a roller, $b^4$, and an arm, $b^5$. When the weigh beam is in its lowermost position it contacts with the lug, $b^2$, causing the retarding device, $b$, to turn on its axis so that the roller, $b^4$, is carried to its operative position above the weigh beam. As the movable weighing receptacle makes its first downward movement, the weigh beam rises and contacting with the roller, $b^4$, is gradually checked and its momentum and vibrations quickly overcome. By reason of the roller contacting with the beveled surface, $b^6$, (on the weigh beam) and the vibrations of the weigh beam intermittently breaking this contact, the retarding device, $b$, will automatically drop by force of gravity to the position shown in Fig. 1, and thereafter the weigh beam will be free to rise to its highest position and may be manipulated thereafter to its intermediate or balancing position free from the influence of said retarding device. The arm, $b^5$, is formed with an outer curved surface which coöperates with the pin, $b^7$, carried on the free end of the weigh beam. Whenever the weigh beam approaches its intermediate position and contacts against the roller, $b^4$, thereby turning the retarding device, $b$, on its axis, the arm, $b^5$, will pass beneath the pin, $b^7$, so that the pin will ride upon the curved surface of the arm, $b^5$, insuring a favorable operation of the weigh beam.

I have shown the swinging pendant, $c$, pivotally supported to the stationary frame, at $c'$, provided with the pivoted pawl, $c^2$, at its lower end arranged to operate somewhat in the same manner as in the said application. This pendant coöperates with stops, $c^3$, (Fig. 2) carried by the movable receptacle. These stops are adjustable and are supported on the segment bracket, $c^4$, which is bolted to the movable receptacle. Instead of employing two gravity pawls therefor as in said application, I employ adjustable stops on the segment bracket and the swinging pawl, $c^2$, supported on the pendant. The slot and pin construction, $c^5$, permits the pawl, $c^2$, to pass freely over the stops, $c^3$, in its retracting movement.

I employ the pawl, $c^6$, pivoted on an extension, $c^7$, formed on the pendant, $c$, with its nose, $c^8$, projecting downwardly in the path of the roller, $c^9$, formed on the cam, $c^{11}$. The cam is pivoted, as in the said application, on the movable receptacle $c^{12}$. The cam, $c^{11}$, is connected by the link, $c^{13}$, to the discharge gate, $c^{14}$, for the movable receptacle. All of these parts are substantially as shown in the said application. I pivot the gravity latch, $c^{15}$, on the movable receptacle above and at the left of the pivot, $c^{12}$, for the cam, $c^{11}$. The crank arm, $c^{16}$, is pivoted at $c^{17}$ to the movable receptacle and the short arm, $c^{18}$, acts as a lock for said gravity latch, $c^{15}$. The trip, $c^{19}$, is pivotally supported on the pendant, $c$, and operates to trip the crank arm, $c^{16}$, exactly as described in my said application. I employ a spring, $c^{21}$, having a cross-rib (not shown) which coöperates with the slots, $c^{22}$, extending at different angles across the trip, $c^{19}$, (these slots being shown in dotted lines in Fig. 3) to hold said trip in inoperative and operative positions; it being understood that the rib will spring into the respective slots so as to yieldingly lock the trip in either position.

The operation of the parts just mentioned is as follows: Normally, the load having been discharged, the discharge gate closes by gravity. This operation carries the lower end of the pendant, $c$, to its extreme right hand position where it is held by the right hand stop, $c^3$, the movable receptacle having moved to its highest position. When said receptacle has received a certain proportion of its load, it moves down sufficiently to release the stop, $c^3$, from the pendant and the latter swings to the left until engaged by the left hand stop, $c^3$, (see Fig. 3.) Additional load moves the receptacle down to its lowest position, thus releasing the stop from the pendant allowing the latter to swing to its extreme left hand position. This movement causes $c^{19}$ to trip the crank arm, $c^{16}$, unlocking the latch, $c^{15}$. The pressure, due to the weight of the load on the discharge gate, through the beveled surface, $c^{23}$, on the cam, $c^{11}$, against a corresponding surface on the latch, raises the latter and the cam turns on its axis. During this movement the roller, $c^9$, freely passes the pawl, $c^6$, but upon the return movement of the cam, $c^{11}$, due to the closing of the discharge gate by gravity, the roller, $c^9$, contacts against the nose of the pawl, $c^6$, and thereby restores the pendant, $c$, to its normal position as described above. The further movement of the cam $c^{11}$ carries the roller $c^9$ out of contact with the nose of the pawl $c^6$ by reason of the difference in the arcs of movement of the cam and the pawl. At the end of the return movement of the cam $c^{11}$, the gravity latch $c^{15}$ drops down into normal locking position, thereby permitting the crank arm $c^{16}$ to move back to its normal position such that the short arm $c^{18}$ will again rest above the latch $c^{15}$, locking same in its normal locking position; it being understood that prior to the time that the gravity latch drops back to its normal position the crank arm $c^{16}$ is held against return movement by reason of the nose of the latch $c^{15}$ projecting into the path of the movement of the short arm $c^{18}$, thereby blocking the crank arm $c^{16}$ against retracting movement.

In my improved device I employ a feed gate, $d$, for the stationary hopper (see Fig. 2) and the dribble gate, $d^1$. The feed gate, $d$, normally closes by gravity in a manner substantially as that explained in said application excepting that the said gate closes in one movement only and the dribble gate, $d^1$, is thereafter operated to shut off completely the flow of grain from the stationary receptacle. I employ a counterpoise, $d^2$, for the feed gate and a separate counterpoise, $d^3$, for the pendant $c$ and its associated parts and in view of a further application covering the mechanism of said gates a more detailed description is not deemed necessary herein, excepting to explain that the pendant, $c$, during the operation of loading is operated by the feed gate, $d$, by means of the intermediate lever, $d^4$ (see Fig. 2) its counterpoise, $d^3$, and the crank arm, $d^5$, and its counterpoise, $d^2$, in the manner described and explained in the application Ser. No. 491,152. The feed gate first operates to closing position and thereafter the bifurcated end, $d^6$, of the crank arm, $d^5$, strikes the shoe, $d^7$, which in turn causes the shaft, $d^8$, to oscillate until the gravity-opening dribble gate, $d^1$, is closed. This final movement of the crank arm, $d^5$, occurs when the pawl, $c^2$, passes the stop, $c^3$, at the extreme left of the plate $c^4$. The operation of the dribble gate, $d^1$, is very simple in that it is closed by $d^6$ contacting against the shoe, $d^7$, and thereby forcing the shaft, $d^8$, to rotate until the dribble gate is completely closed and upon the withdrawal of the bifurcated end, $d^6$, of the crank arm, $d^5$, which occurs when the crank arm is retracted to normal position, the gravity or weight of the dribble gate, $d^1$, permits it to drop to open or normal position.

Having thus described my invention, I claim:

1. In a weighing machine, the combination of a stationary frame, a movable supporting frame, a movable receptacle capable of being loaded supported by said movable frame, a steelyard member fulcrumed to said stationary frame and connected to said movable frame near said fulcrumed point, a supplemental lever supported on the stationary frame and projecting below the steelyard member, a retarding device pivotally mounted and capable of projecting above the free end of said steelyard member, substantially as specified.

2. In a weighing machine, the combination of a stationary frame, a movable supporting frame, a movable receptacle capable of being loaded supported by said movable frame, a steel-yard member fulcrumed to said stationary frame and connected to said movable frame near said fulcrumed point, a supplemental lever projecting below the steelyard member and near the free end thereof, a retarding device pivotally mounted and capable of projecting above the free end of said steelyard member, substantially as specified.

3. In a weighing machine, the combination of a stationary frame, a movable supporting frame, a movable receptacle capable of being loaded supported by said movable frame, a bifurcated steel-yard member, having upper and lower graduations thereon, fulcrumed on the stationary frame, a supplemental lever supported on the stationary frame and projecting below the steelyard member, a retarding device pivotally mounted and capable of projecting above the free end of said steelyard member, substantially as specified.

4. In a weighing machine, the combination of a movable hopper capable of being loaded, a stationary hopper, and a gate for each hopper, means for controlling the movement of the gate for the stationary hopper regulated by the movement of said movable hopper, a movable supporting frame, a steelyard member suspended at the side of said frame, and connecting devices between said member and said supporting frame, a supplemental lever for starting the steelyard upward and the movable hopper downward, and a retarding device for arresting the movement of said steelyard and said hopper, substantially as specified.

5. In a weighing machine, the combination of a movable hopper capable of being loaded, a stationary hopper, and a gate for each hopper, means for controlling the movement of the gate for the stationary hopper regulated by the movement of the hopper including a swinging pendant, a movable supporting frame, and a steelyard member suspended from the side of said frame, connecting devices between said member and said supporting frame, and a supplemental lever for starting the steelyard upward and the movable hopper downward, and a retarding device for arresting the movement of said steelyard and said hopper, substantially as specified.

6. In a weighing machine, the combination of a movable hopper capable of being loaded, a stationary hopper, and a gate for each hopper, means for controlling the movement of the gate for the stationary hopper regulated by the movement of the hopper including a swinging pendant, a movable supporting frame and a steelyard member suspended from the side of said frame, connecting devices between said member and said supporting frame, and means connecting the gate of the movable hopper with said swinging pendant, and a supplemental lever for starting the steelyard upward and the movable hopper downward, and a retarding device for arresting the movement of said steelyard and said hopper, substantially as specified.

7. In a weighing machine, the combination of a movable hopper capable of being loaded, a stationary hopper, and a gate for each hopper, means for controlling the movement of the gate for the stationary hopper regulated by the movement of the hopper including a swinging pendant and pivoted pawl on the said pendant, a movable supporting frame, and a steelyard member suspended from the side of said frame, a connecting device between said member and said supporting frame, and a supplemental lever for starting the steelyard upward and the movable hopper downward, and a retarding device for arresting the movement of said steelyard and said hopper, substantially as specified.

8. In a weighing machine, the combination of a stationary frame with a movable hopper, and a movable supporting frame between the hopper and stationary frame, a balancing lever member additional to said supporting frame, a stationary hopper, and gates for said stationary and movable hoppers, means for controlling the movement of both gates regulated by the movement of the hopper, said means including a swinging pendant, a rotatable member, and locking devices between said member and said pendant operated by said pendant, for the purpose specified.

9. In a weighing machine, the combination of a movable hopper, $a$, capable of being loaded, a stationary frame $a^8$ and a swinging member, $c$, a gate $c^{14}$ for said movable hopper, an intermediate connecting device $c^{13}$, oscillating part $c^{11}$ locking device, $c^{16}$, for said gate controlled by said swinging member, substantially as specified.

10. In a weighing machine, the combination of a movable hopper capable of being loaded, a movable gate for said hopper, a swinging intermediate device controlled by the movement of the said hopper and capable of being retracted to normal position by the return movement of said gate, a swinging cam device, and locking devices for holding said cam against movement until said hopper has received its load, and means connected with said intermediate device for releasing said locking device, substantially as specified.

11. In a weighing machine, the combination of a movable hopper, a stationary hopper, gates for both of said hoppers, a supplemental gate for said stationary hopper, and swinging intermediate levers between said first mentioned gates for regulating the closing movement of one gate and the opening movement of the other, and means connected with one of said intermediate levers for effecting the closing movement of said supplemental gate, substantially as specified.

12. In a weighing machine, the combination of a movable receptacle capable of being loaded, a discharge gate for said receptacle, intermediate connecting devices between said gate and said movable receptacle, a locking device for holding said discharge gate locked, means connected with said intermediate device for positively restoring said locking device to normal locking position, substantially as and for the purpose specified.

13. In a weighing machine, the combination of a stationary frame, a movable supporting frame, a movable receptacle, a steelyard member fulcrumed on said stationary frame, an arm transverse to said steelyard member connecting same with said movable frame, and a supplemental lever also projecting transverse to said steelyard member, substantially as specified.

In testimony whereof, I have hereunto set my hand this 18th day of March, 1909.

ANDREW SONANDER.

Witnesses:
CHAS. I. WELCH,
OLIVER T. CLARKE.